Jan. 30, 1962   RENÉ-PHILIPPE JACCARD   3,018,613

TIME-METER

Filed Aug. 25, 1959

United States Patent Office 3,018,613
Patented Jan. 30, 1962

3,018,613
TIME-METER
René-Philippe Jaccard, Petit-Lancy, Geneva, Switzerland, assignor to Samuel Jack Kaufman, New York, N.Y.
Filed Aug. 25, 1959, Ser. No. 835,888
Claims priority, application Switzerland Sept. 1, 1958
2 Claims. (Cl. 58—22.9)

My invention has for its object a time-meter comprising a movement including a driving spring, a center gear, the wheel of which is frictionally fitted over its spindle, a rocking member connected, on the one hand, with the driving spring and, on the other hand, through a toothed sector rigid therewith with the pinion of said gear, said rocking member pivoting when the movement is operative between a first and a second stop, while an indicator member rigid with the spindle of said movable gear moves between two points corresponding to the impact of the rocking member with said stop and is associated with a scale-carrying dial and means for simultaneously setting the driving spring and returning the indicator member to its starting position, a case housing these various parts.

According to my invention, the last-mentioned means of this time-meter include a pusher knob extending through the case along the axis of the meter and a lever adapted to rock round a pivot perpendicular to said axis and of which one arm cooperates with said knob and the other arm is connected with said rocking member, the arrangement being such that upon depression of said knob, the rocking member is urged back into engagement with the first knob, which has for its result to set the driving spring and to make the spindle carrying the indicator member rock until the latter has returned to its starting point.

I have illustrated by way of example in the accompanying drawings a preferred embodiment of my invention in association with a telephone set. In said drawings.

Figure 1:
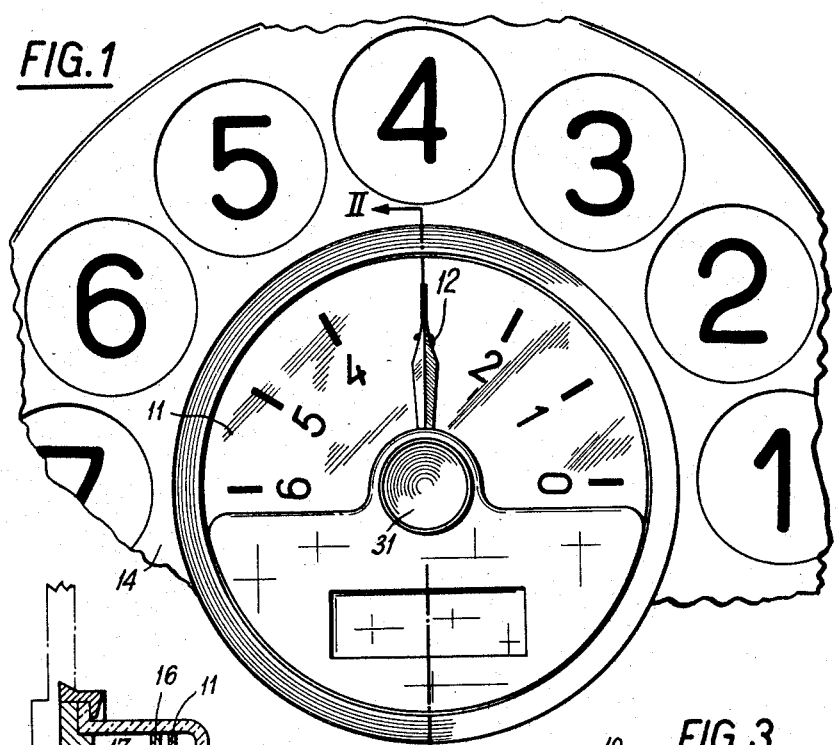
FIG. 1 is a front view of the meter and of a portion of the call dial.
Figure 2:
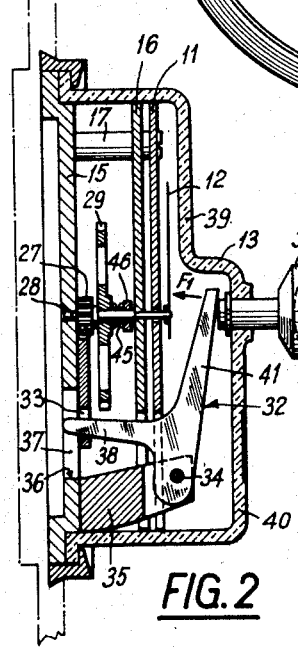
FIG. 2 is a sectional view through line II—II of FIG. 1.
Figure 3:
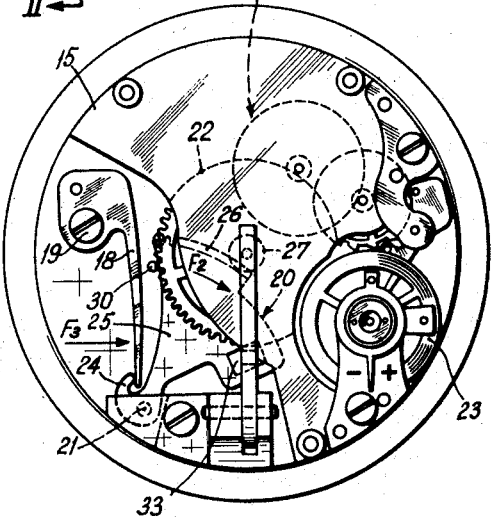
FIG. 3 is a plan view of the meter after removal of the pusher knob, dial and indicator hand.

The meter illustrated includes a clockwork movement 10, a dial 11 carrying a scale extending between zero and six minutes, an indicator hand 12 and a protecting case 13 fitted over the movement. It is mounted on the stationary section of the case of a telephone set over which is revolvably mounted the conventional call dial 14 through suitable securing means which are not illustrated.

The movement 10 includes a plate 15 and a bridge 16 connected with the plate through the studs 17, a driving blade spring 18 secured at one end through the stud 19 to the plate 15, a rocking member 20 pivotally secured at 21 to said plate, a center gear 22 and regulating means 23.

The rocking member 20 terminates with a nose 24 engaging the end of the blade 18 and the body 25 of said rocking member flares away from said nose and its outer sector-shaped end is provided with teeth 26 meshing with the pinion 27 of the gear 22. Said gear is carried by a spindle 28 to which is keyed said pinion 27, while a wheel 29 is urged against the side of said gear pinion 27 by a spring 45 bearing against a collar 46, so that it may revolve against slight friction round said spindle. A stop 30 rigid with the plate 15 defines one of the ends of the pivotal path of the rocking member 20. When the rocking member engages said stop, the hand 12 rigid with the spindle 28 registers with the zero digit of the scale on the dial 11.

The return of said hand into its starting position in registry with the figure 6 of its scale and the winding of the driving spring, i.e. the setting of the blade 18 are performed simultaneously through the agency of a pusher knob 31 sliding axially through the center of the cover 13 and cooperating with one of the arms 41 of the lever 32, the other arm 38 of which enters an opening 33 formed in the flaring end of the rocking member 20. The pivot 34 of said lever which moves in a plane perpendicular to the dial 11 is mounted on a support 35 secured to the plate 15.

When the pusher knob 31 is depressed, the lever 32 pivots in the direction of the arrow F1 and the rocking member 20 pivots in the direction of the arrow F2, which has for its result, on the one hand, to make the spindle 28 revolve with reference to the wheel 29 which is locked by the regulating means 23 and, on the other hand, to stress the blade 18 by bending it in the direction of the arrow F3.

The position to be occupied by the rocking member 20 at the end of this operation is defined by the edge 36 of an opening 37 in the plate 15, which opening is then engaged by the end of the arm 38 on the lever 32. When the rocking member reaches its end position, the hand 12 which has revolved with the spindle 28 registers with the digit six on the dial scale.

Assuming the movement has been set and the hand 12 registers with the digit six in the manner described, when the pusher knob 31 is released, the hand 12 moves over the dial and the rocking member 20 returns into its starting position. After a period equal to six minutes has elapsed, the rocking member 26 is stopped by the stop 30 and the meter stops.

The case 13 is made of any plastic material and its front section includes a transparent part 39 adjacent the dial 11 and a ground part 40 extending outwardly of the part 39, so as to form a space in which moves in a concealed manner the arm 41 of the lever 32.

The driving spring may as well be a coil spring.

What I claim is:

1. In a time-meter, the combination of a clockwork mechanism including a plurality of gears lying in parallel planes, a toothed sector adapted to pivot round an axis perpendicular to said planes and engaging one of said gears, said sector being provided with an opening near one of its edges at a distance from its pivot, a driving spring engaged by said sector and urging the latter into pivotal motion, a stop defining the ultimate position to be occupied by the toothed sector under the action of said spring and a two-arm lever pivoting round an axis parallel with said planes and one arm of which engages the opening in said sector, means for shifting the other arm of said lever in a predetermined direction to shift the sector away from its stop and tension the driving spring, and an abutment for the lever defining the end of its path when shifting said other arm in said predetermined direction.

2. In a time-meter, the combination of a clockwork mechanism including a plurality of gears lying in parallel planes, a toothed sector adapted to pivot round an axis perpendicular to said planes and engaging one of said gears, said sector being provided with an opening near one of its edges at a distance from its pivot, a driving spring engaged by said sector and urging the latter into pivotal motion, a stop defining the ultimate position to be occupied by the toothed sector under the action of said spring and a two arm lever pivoting round an axis parallel with said planes and one arm of which engages the opening in said sector, a push button adapted to move along a line perpendicular to said plane and to thereby engage and shift the other arm of said lever in a predetermined direction to shift the sector away from its stop and tension the driving spring, and an abutment for the lever defining the end of its path when shifting said other arm in said predetermined direction.

References Cited in the file of this patent

UNITED STATES PATENTS

| | | |
|---|---|---|
| 319,145 | St. John | June 2, 1885 |
| 659,329 | Sutherland | Oct. 9, 1900 |
| 847,689 | Porter | Mar. 19, 1907 |
| 1,111,123 | Zellin | Sept. 22, 1914 |
| 2,272,904 | Burton | Feb. 10, 1942 |
| 2,304,012 | Neff | Dec. 1, 1942 |
| 2,626,661 | McDowell | Jan. 27, 1953 |
| 2,895,549 | Gruber | July 21, 1959 |

FOREIGN PATENTS

| | | |
|---|---|---|
| 573,147 | France | Mar. 5, 1924 |
| 145,734 | Switzerland | May 16, 1931 |
| 596,035 | Germany | Apr. 25, 1934 |
| 124,305 | Great Britain | Mar. 27, 1919 |